United States Patent Office 3,848,062
Patented Nov. 12, 1974

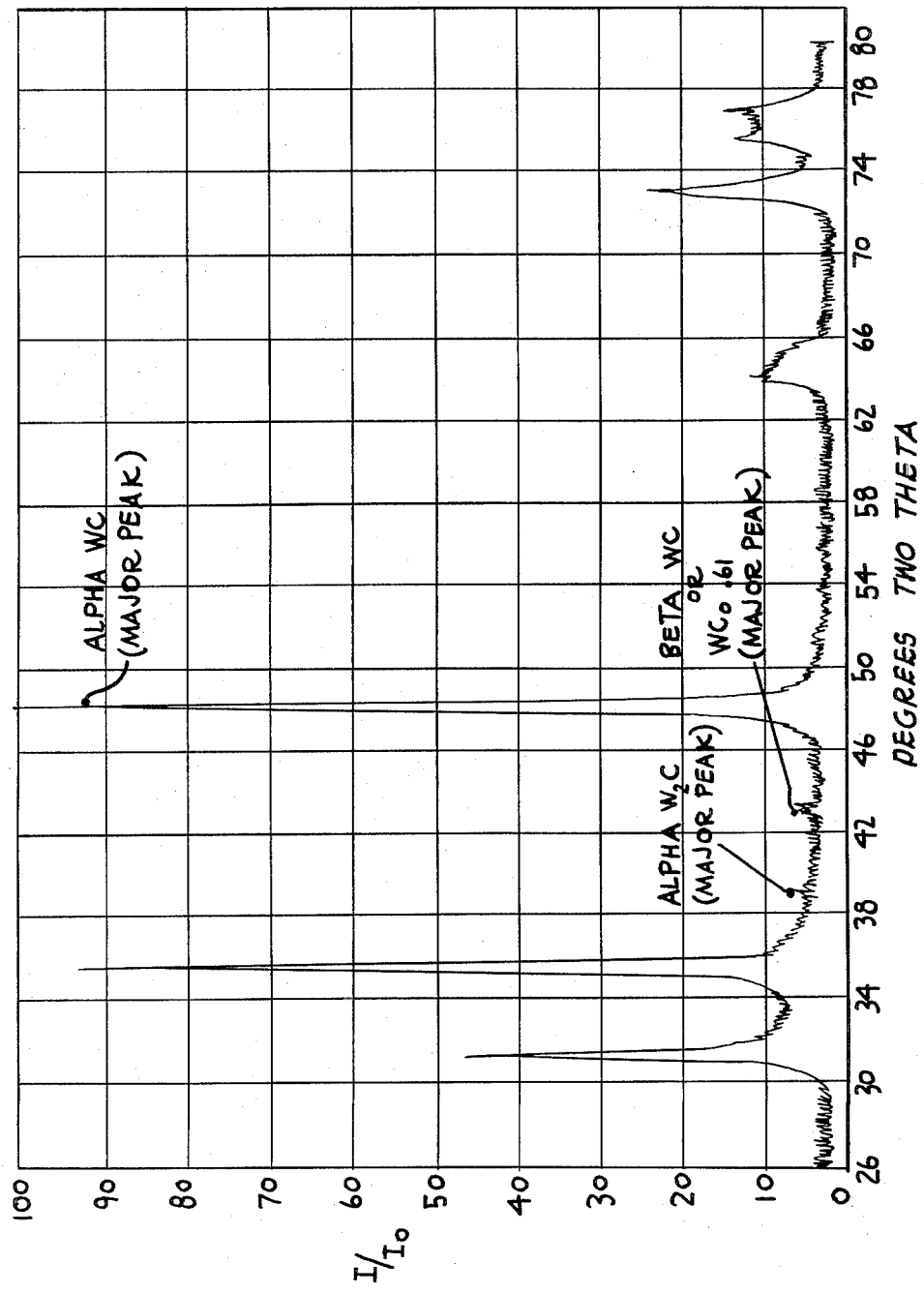

3,848,062
PREPARATION OF MONOTUNGSTEN CARBIDE
Roger A. Steiger, Canal Fulton, and William L. Wilson, Barberton, Ohio, assignors to PPG Industries, Inc., Pittsburgh, Pa.
Filed Feb. 17, 1972, Ser. No. 227,049
Int. Cl. C01b 31/34; C22c 29/00
U.S. Cl. 423—440
15 Claims

ABSTRACT OF THE DISCLOSURE

Tungsten monocarbide is produced by reacting in the vapor phase a volatile tungsten compound, e.g., tungsten hexachloride, with a source of carbon present in amounts sufficient to provide at least one atom of carbon for every atom of tungsten reacted and, thereafter, calcining the resulting product at temperatures and for a time sufficient to obtain tungsten monocarbide as the principal product. Calcination conditions of about 1000° C. for about one to two hours produce a product substantially free of ditungsten carbide.

DESCRIPTION OF THE INVENTION

Tungsten monocarbide (WC) is manufactured on a large scale by carburization of tungsten metal powder with carbon black in carbon tube or open high frequency furnaces under a hydrogen atmosphere. Another method for the production of tungsten monocarbide directly from calcium tungstate ore is described in U.S. Pat. 3,482,941. Recently, the production of tungsten carbide by the vapor phase reaction of tungsten halide, e.g., tungsten hexachloride, with a carbon source, e.g., methane, in the presence of hydrogen has been described. See, for example, U.S. Pats. 3,253,886 and 3,340,020. However, the principal product obtained by the aforementioned vapor phase process is ditungsten carbide ($W_2C$).

Tungsten monocarbide is used in the production of cemented tungsten carbides which are useful in the manufacture of cutting tools and abrasives. The aforementioned vapor phase process produces finely-divided particles which would be particularly useful in cemented carbide applications if tungsten monocarbide could be prepared in this manner.

It has now been found that tungsten monocarbide can be produced by vapor phase reaction of a volatile tungsten compound with a vaporous source of carbon by first reacting the volatile tungsten compound with a carbon source that is present in amounts sufficient to provide at least one atom of carbon for each atom of tungsten reacted, withdrawing the tungsten carbide product from the reaction zone, and heating it at temperatures and for a time that are sufficient to produce a product having monotungsten carbide as the principal tungsten carbide ingredient. Temperatures of about 1000° C. for about one to two hours have been found adequate to produce a substantially ditungsten carbide free product.

BRIEF DESCRIPTION OF THE DRAWINGS

The present invention will be better understood by reference to the accompanying drawings wherein:

FIG. 3 is an X-ray diffraction tracing of the tungsten carbide product of FIG. 2 after it has been calcined for an additional hour at 1000° C. under a blanket of hydrogen.

DETAILED DESCRIPTION

Figure 1:
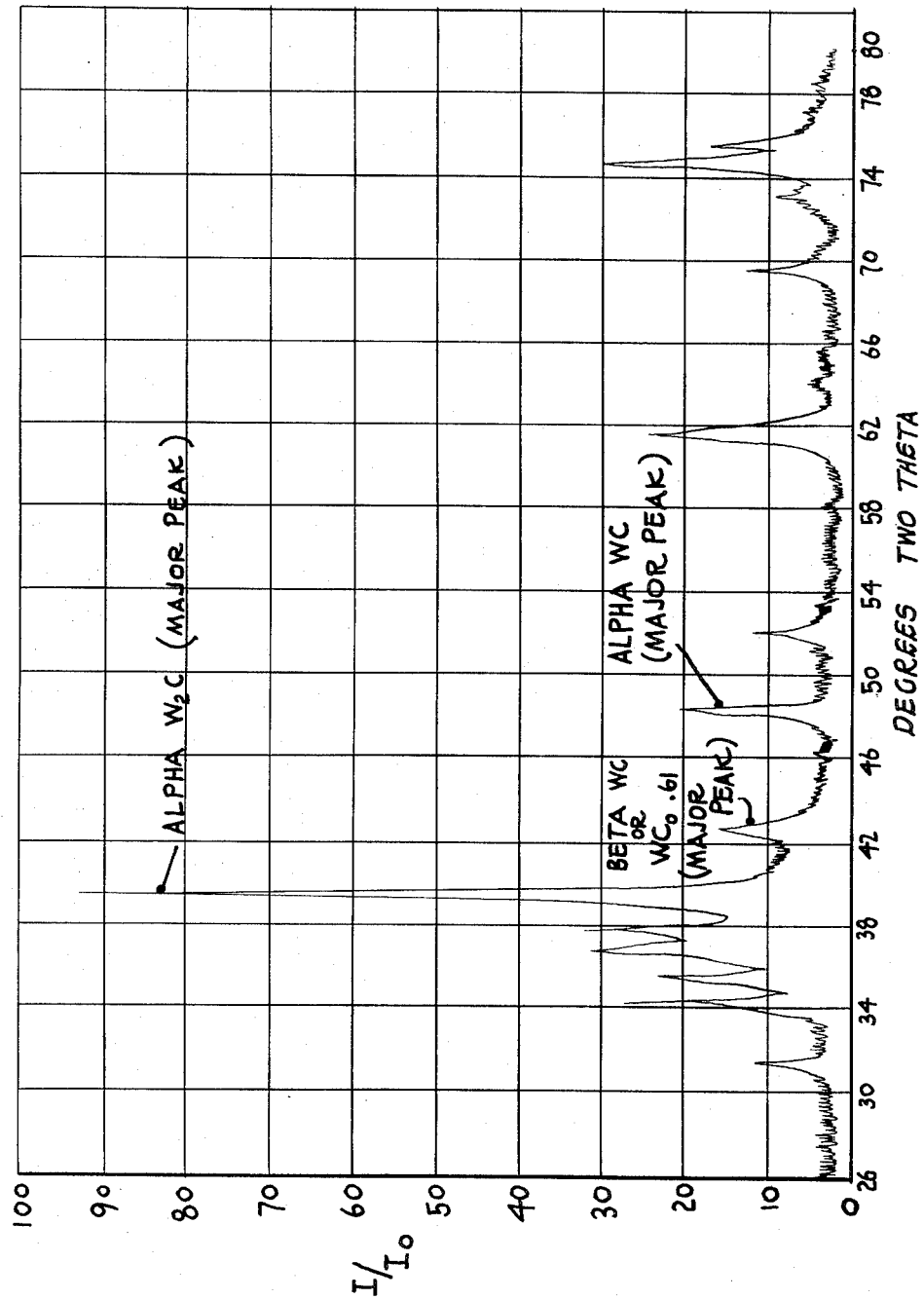
FIG. 1 is an X-ray diffraction tracing of a tungsten carbide product produced by the vapor phase reaction of tungsten hexachloride with 1,1,2-trichloroethane at a reaction temperature of about 2000° C.

The production of tungsten carbide by the vapor phase reaction of a vaporous source of carbon, such as methane, with a volatile tungsten compound, such as tungsten hexachloride, in the presence of a reducing agent, such as hydrogen, at tungsten carbide forming temperatures has been previously described. See, for example, U.S. Pats. 3,253,886, 3,340,020, 3,482,941, 3,529,988 and 3,574,672. Vapor phase reaction temperatures that can be used for the production of tungsten carbide vary from about 300° C. to about 3000° C., more commonly from about 1500° C. to about 2500° C.

Volatile tungsten compounds that can be used in the present process are compounds of tungsten that are volatile at the reaction temperatures used. Exemplary of such compounds are the tungsten halides, such as tungsten hexachloride and tungsten hexafluoride, as well as the subchlorides and fluorides of tungsten, e.g., $WCl_5$, $WCl_4$, $WCl_2$, $WO_2Cl_2$ (tungsten dioxide dichloride), $WOCl_4$ (tungsten oxide tetrachloride), $WOF_4$ (tungsten oxide tetrafluoride) and $W(CO)_6$ (tungsten hexacarbonyl). The tungsten halides are preferred since both tungsten hexacarbonyl and the tungsten oxyhalo compounds contain oxygen which is considered to be an impurity in the tungsten carbide product for some applications, e.g., cemented carbides.

The production of tungsten carbide by vapor phase reaction of a volatile tungsten compound with a vaporous carbon compound is typically conducted in the presence of a reducing agent, such as aluminum, hydrogen or combinations thereof. Typically, hydrogen alone is used.

In the process described herein, volatile hydrocarbons or halogenated hydrocarbons are customarily used as the vaporous source of carbon. As used herein, the term "halogenated hydrocarbons," e.g., "chlorinated hydrocarbons," is intended to mean and include both compounds of carbon, halogen and hydrogen and compounds of carbon and halogen, e.g., carbon tetrachloride.

Examples of hydrocarbons that can be used as a source of carbon in the process described herein include: the normally gaseous or liquid but relatively volatile hydrocarbons, including saturated and unsaturated $C_1$–$C_{12}$ hydrocarbons, such as methane, ethane, propane, the butanes, the pentanes, decanes, dodecanes, ethylene, propylene, the butylenes and amylenes, symmetrical dimethylethylene and like alkenes; cycloaliphatic and aromatic hydrocarbons, such as cyclopentane, cyclohexane, toluene, benzene, etc.; and acetylenic compounds of which may be noted acetylene, methyl acetylene, ethyl acetylene and dimethyl acetylene. Methane or propane is economically preferred for this purpose. Rarely are hydrocarbons of more than twelve carbons used.

Examples of halogenated hydrocarbons that can be used as the source of carbon in the process described herein include: compounds containing from one to eight carbon atoms, such as methyl chloride, chloroform, methylene chloride, carbon tetrachloride, dichlorodifluoromethane, amyl chloride, cholorethane, vinyl chloride, 1,1-dichlorotheylene, 1,2-dichloroethylene, 1,1-dichloroethane, 1,2-dichloroethane, ethylene dibromide, trichloroethylene, perchloroethylene, propylene dichloride, 1,1,2-trichloroethane, 1,1,1-trichloroethane, 1,1,1,2- and 1,1,2,2-tetrachloroethane, hexachloroethane and like aliphatic chlorides, fluorides, bromides and iodides, containing up to about eight carbon atoms, preferably up to six carbon atoms. Aromatic halocarbon compounds, e.g., chlorocarbon compounds, also can be used. Such compounds include $C_6$–$C_9$ halogenated aromatic compounds, such as monochlorobenzene, orthodichlorobenzene, paradichlorobenzene and the like. Cycloaliphatic halides, such as the $C_5$–$C_6$ aliphatic halides, e.g., chlorinated cyclopentadiene, cyclohexyl chloride, etc., can also be used. Mixed halohydrocarbons, e.g., chlorofluorohydrocarbons, can also be used.

Typically, the hydrocarbon and/or halogenated hydrocarbon used should be readily vaporizable (volatile) at the temperatures of use without tar formation since otherwise unnecessary difficulties which are unrelated to the process itself can arise, e.g., plugging of lines by decomposition and/or polymerization products produced in the course of vaporizing the hydrocarbons and halogenated hydrocarbons.

The amount of reducing agent, e.g., hydrogen, utilized in the above-described process should be at least that amount which is required stoichiometrically to satisfy the theoretical demand of the reaction. Typically, the amount of hydrogen used is in substantial excess of the theoretical amount. For example, when the tungsten halide used is tungsten hexachloride and the source of carbon is methane, the theoretical amount or demand of hydrogen required can be expressed by the equation, $$WCl_6 + CH_4 + H_2 \rightarrow WC + 6HCl$$

Similarly, when other tungsten compounds are used, the amount of elemental hydrogen used should be sufficient to satisfy the theoretical demand of the equation illustrating the reduction of the compound with hydrogen and reaction with the carbon source chosen. Often, the amount of hydrogen utilized will be in excess of ten times and often as high as 100 times the amount of hydrogen shown to be required by the aforementioned equation. While hydrogen is included in the above equation, it is not, in the strict sense, a reactant since the hydrocarbon or halogenated carbon can be reacted with the tungsten halide to produce tungsten carbide without added hydrogen. However, hydrogen is generally used because of its reducing capacity and consequent lowering of the decomposition temperature of the tungsten halide.

In accordance with the present process, the amount of hydrocarbon and/or halogenated hydrocarbon introduced into the reaction zone is that amount which is at least sufficient to provide a stoichiometric amount of carbon in the solid reaction product, based on a balanced equation for the production of monotungsten carbide from the amount of volatile tungsten compound charged to the reaction zone and reacted therein. Stated another way, the vaporous source of carbon should be introduced into the reaction zone in amounts sufficient to provide in the solid tungsten carbide product at least one atom of carbon for each atom of tungsten introduced into the reaction zone and reacted therein. That amount provides the necessary amount of excess or free carbon in the tungsten carbide product so that the monotungsten carbide can be produced readily in the subsequent calcination step. Usually at least 20 percent, and often 50 to 100 percent, in excess of the amount of carbon required to satisfy the aforesaid requirements is used. As indicated, mixtures of hydrocarbons and halogenated hydrocarbons can be used as the volatile carbon source.

In carrying out the vapor phase reaction of the volatile tungsten compound to form tungsten carbide in the manner described above, any convenient method can be employed. Thus, the manner of introducing the reactants into the reaction zone or the type of apparatus employed is not crticial to the present process. For example, all of the reactants can be heated to or above reaction temperature and then admixed in a suitable reaction zone, or one or more, but not all, of the reactants can be heated to temperatures in excess of reaction temperature and admixed in the reaction zone with other reactant(s) which have been introducved into the reaction zone at temperatures below reaction temperature. The highly heated reactant(s) bring the remaining reactant(s) to reaction temperature quickly and cause formation of tungsten carbide.

A convenient and a preferred method for producing monotungsten carbide in accordance with the present invention is by employing a plasma generator to furnish sufficient heat to the reaction zone to achieve tungsten carbide forming temperatures. Such a device is illustrated in U.S. Pat. 3,340,020. Basically, the aforementioned technique mounts a plasma generator atop a reactant inlet assembly which, in turn, is mounted atop a closed cylindrical reactor. Normally, all three of these components are in vertical alignment. The plasma generator can be either an arc plasma generator or an induction plasma generator. In both instances, electrical energy is converted to heat energy, the former by an arc passing between electrodes, the latter by passing a current through a high frequency induction coil.

In the operation of a plasma generator, a suitable plasma forming gas, such as hydrogen or an inert gas, such as argon, helium, etc., is passed through the plasma generator and is heated thereby to very high temperatures. Gas temperatures of from 2000–5000° K. are typically attained with plasma generators. Naturally, the plasma gas must be chemically inert to the reactants to avoid competing reactions. As the highly heated plasma gas exists from the plasma generator, it passes through the reactant inlet assembly, i.e., past the reactant inlet openings therein, and the reactants, i.e., volatile tungsten compound and carbon source, are introduced into the plasma gas. If hydrogen is not used as the plasma gas, hydrogen can be introduced into the plasma gas through the reactant inlet assembly alone or with the reactants. Hydrogen is used often also as a carrier gas for introducing the reactants into the plasma gas.

As indicated previously, the principal tungsten carbide product produced by the vapor phase reaction of a volatile tungsten compound with a volatile source of carbon in the presence of hydrogen is ditungsten carbide ($W_2C$). Reference is made now to FIG. 1 which is an X-ray diffraction tracing of a tungsten carbide product produced by the vapor phase reaction of tungsten hexachloride with 1,1,2-trichloroethane in the presence of hydrogen. FIG. 1 shows that the major product is alpha-ditungsten carbide with small amounts of alpha and beta-monotungsten carbide. Analytically, this product represents about 70 weight percent ditungsten carbide and about 30 weight percent monotungsten carbide. As used herein, the term "monotungsten carbide" is intended to include all crystalline forms of monotungsten carbide, e.g., alpha and beta. Similarly, the term "ditungsten carbide" is intended to include all crystalline forms of that compound. The term "tungsten carbide" is intended to refer to the products of tungsten and carbon without designating crystalline forms or the ratio of chemically combined tungsten and carbon.

In accordance with the present invention, the tungsten carbide product produced by the vapor phase reaction of volatile tungsten compound with a volatile source of carbon is calcined at temperatures and for a period of time sufficient to convert substantially all of the ditungsten carbide ($W_2C$) in the product to monotungsten carbide (WC) and to produce tungsten carbide having monotungsten carbide as its principal tungsten-carbon component. Typically, calcination temperatures of from about 500° C. to about 1500° C., preferably from about 800° C. to about 1200° C. are used. Calcinations periods of from about 15 minutes to about 12 hours, preferably from about one to about four hours, are used. It has been found that calcination at 1000° C. for from one to two hours produces a tungsten carbide product substantially free of ditungsten carbide.

Calcination of the tungsten carbide product can be performed in any conventional heating equipment capable of attaining the aforementioned calcination temperatures. Examples thereof include rotary calciners, muffle furnaces, fluid bed calciners, multiple hearth calciners. etc. Typically, the calcination is performed at atmospheric pressures but can be performed at reduced pressures.

The calcination step is typically conducted in an inert atmosphere, e.g., under a blanket of inert gas. By "inert gas" is intended to mean a gas which does not significantly react chemically or adsorb physically on the surface of the tungsten carbide product being calcined at the temperatures and other conditions of calcination. Suitable examples of gases which furnish an inert atmosphere are hydrogen, argon, helium and hydrogen halide, e.g., hydrogen chloride.

The relative presence or absence of ditungsten carbide or monotungsten carbide in the tungsten carbide product removed from the reactor or from the calciner can be readily ascertained by withdrawing a sample of the product to be analyzed and subjecting it to an X-ray diffraction tracing. Thus, in one feature of the present process, the tungsten carbide product removed from the reactor is calcined in a suitable calciner under predetermined calcination conditions, i.e., at a given temperature, e.g., 900° C., for a given period of time, e.g., thirty minutes. A sample of the calcined product is removed from the calciner, subjected to X-ray diffraction analysis and the calcination, if needed, continued until the amount of monotungsten carbide product desired is achieved. Typically, the monotungsten carbide product which is substantially free of ditungsten carbide will contain less than 5 weight percent of ditungsten carbide.

Figure 2:
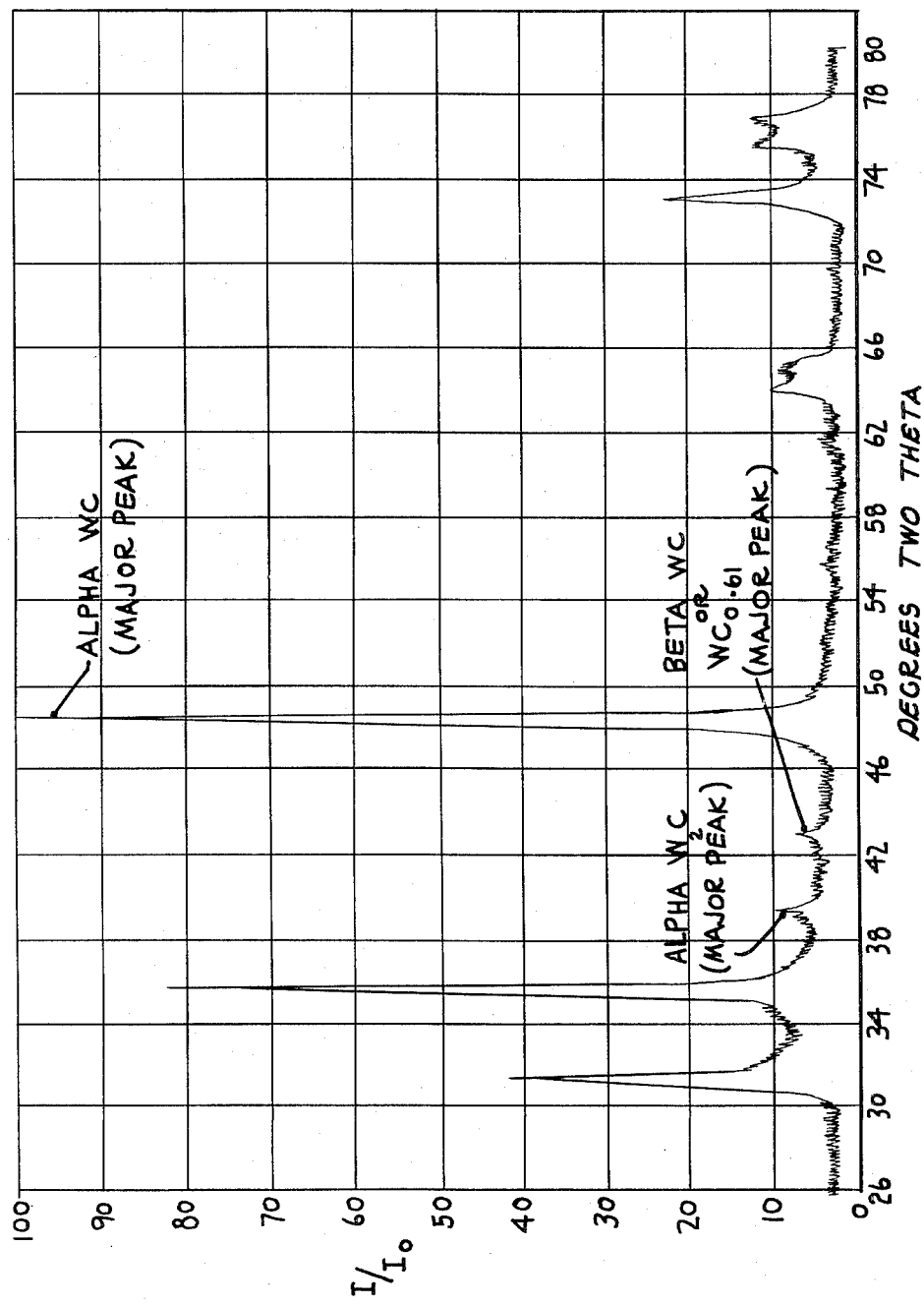
FIG. 2 is an X-ray diffraction tracing of the product of FIG. 1 after it has been heated at 1000° C. for one hour under a blanket of hydrogen.

Referring now to FIG. 2, there is illustrated an X-ray diffraction tracing of a tungsten carbide product produced by the vapor phase reaction of tungsten hexachloride with 1,1,2-trichloroethane in a hydrogen plasma that has been calcined at 1000° C. for one hour. The X-ray diffraction tracing shows, in comparison to FIG. 1, the significant reduction of alpha-ditungsten carbide and the significant increase of alpha-monotungsten carbide in the tungsten carbide product. FIG. 2 represents a product containing about 5 weight percent ditungsten carbide and about 95 weight percent tungsten monocarbide.

FIG. 3 is an X-ray diffraction tracing of the product represented by FIG. 2 that has received a further calcination at 1000° C. for an additional hour. It shows a still further decrease in alpha-ditungsten carbide and a further increase of alpha-mono-tungsten carbide in the tungsten carbide product. FIG. 3 represents a product having less than about 2 weight percent ditungsten carbide.

The calcined monotungsten carbide produced in accordance with the present process is typically finely-divided and submicron in size. Typically, the monotungsten carbide particles vary from about 0.1 to about 0.5 microns.

The present process is more particularly described in the following example which is intended as illustrative only since numerous modifications and variations therein will be apparent to those skilled in the art. In the following examples, volumes of gas are expressed in cubic feet per hour at standard conditions (14.7 pounds pressure and 70° F.), i.e., s.c.f.h.

EXAMPLE I

Using a device similar to that described and illustrated in U.S. Pat. 3,485,586, but with a two-slot (upper and lower) reactant inlet mixer assembly, 300 s.c.f.h. of hydrogen were heated by a medium voltage, medium amperage arc heater having a power input of 28 kilowatts. The heater operated with an efficiency of about 58–59 percent at an impedance of 1.32 ohms. The stream of heated hydrogen was projected into a closed reactor. Tungsten hexachloride, produced simultaneously by chlorinating at 400° C. tungsten powder with a stream of chlorine mixed with 75 s.c.f.h. of argon and 25 s.c.f.h. of hydrogen chloride was introduced into the hot hydrogen stream through the bottom slot of the mixer assembly. Vaporized 1,1,2-trichloroethane together with 45 s.c.f.h. of hydrogen, as a carrier gas, was introduced into the hydrogen stream through the top slot of the mixer assembly. The amount of 1,1,2-trichloroethane used was calculated to give about a 100 percent excess of the carbon needed to produce monotungsten carbide. After about 88 minutes of operation, the run was intentionally terminated. About 1,027 grams of tungsten carbide product having an average particle size of about 0.06–0.07 microns was recovered from a cyclone receiver connected to the reactor. X-ray diffraction analysis of this product revealed a product containing about 70 weight percent $W_2C$ and about 30 weight percent WC (FIG. 1).

The tungsten carbide product was calcined at about 1000° C. for about one hour under a blanket of hydrogen. Analysis of this calcined product showed a tungsten carbide composition of about 5 weight percent $W_2C$ and about 95 weight percent WC (FIG. 2). After a further calcination at about 1000° C. for about one hour, the amount of ditungsten carbide ($W_2C$) was reduced to less than 2 weight percent and the amount of monotungsten carbide (WC) increased to about 98 weight percent (FIG. 3). The calcined product had an average particle size of about 0.2 microns.

Although the present process has been described with reference to specific details of certain embodiments thereof, it is not intended that such details should be regarded as limitations upon the scope of the invention except as and to the extent that they are included in the accompanying claims.

What is claimed is:

1. In the process of producing tungsten carbide by vapor phase reaction of a volatile tungsten compound with a vaporous source of carbon at from about 300° C. to about 3000° C. in a reaction zone, the improvement which comprises the steps of introducing into said reaction zone the volatile tungsten compound and the source of carbon in amounts sufficient to provide therein at least one atom of carbon for each atom of tungsten, withdrawing from the reaction zone solid tungsten carbide product having ditungsten carbide as its principal component, and calcining the solid tungsten carbide product at from about 500° C. to about 1500° C. and for a time sufficient to produce monotungsten carbide as the principal component of the tungsten carbide product.

2. The process of Claim 1 wherein the volatile tungsten compound is a tungsten halide.

3. The process of Claim 1 wherein the source of carbon is selected from the group consisting of vaporous hydrocarbons, halogenated hydrocarbons and mixtures of such compounds.

4. The process of Claim 1 wherein the calcination is conducted for from about 15 minutes to about 12 hours.

5. The process of Claim 1 wherein the vaporous source of carbon is used in amounts that provide at least 20 percent stoichiometric excess of carbon.

6. The process of Claim 1 wherein the calcination is conducted at from about 800° C. to about 1200° C. for from about one to about four hours.

7. The process of Claim 1 wherein the vaporous source of carbon is used in amounts that provide from about 50 to about 100 percent stoichiometric excess of carbon.

8. In the process of producing tungsten carbide by vapor phase reaction of a volatile tungsten halide with a vaporous source of carbon at from about 1500° C. to about 2500° C. in a reaction zone, the improvement which comprises the successive steps of introducing into said reaction zone the volatile tungsten halide and the source of carbon in amounts sufficient to provide in the product at least one atom of carbon for each atom of tungsten, withdrawing from the reaction zone solid tungsten carbide product having ditungsten carbide as its principal component, calcining the solid tungsten carbide product in a calciner at from about 500° C. to about 1500° C. for from about 15 minutes to about 12 hours and removing from the calciner solid tungsten carbide having monotungsten carbide as its principal component.

9. The process of Claim 8 wherein the tungsten halide is tungsten hexachloride and the vaporous source of carbon is a $C_1$–$C_{12}$ hydrocarbon, a $C_1$–$C_8$ halogenated hydrocarbon or mixtures of such compounds.

10. The process of Claim 9 wherein the vaporous source of carbon is 1,1,2-trichloroethane.

11. The process of Claim 8 wherein the calcined tungsten carbide product contains less than 5 weight percent ditungsten carbide.

12. The process of Claim 8 wherein the vaporous source of carbon is used in amounts that provide at least a 20 percent stoichiometric excess of carbon.

13. The process of Claim 8 wherein the calcination is conducted at from about 800° C. to about 1200° C. for from about one to about four hours.

14. In the process of producing tungsten carbide by vapor phase reaction of a volatile tungsten compound with a vaporous source of carbon at from about 1500° C. to about 2500° C. in a reaction zone, the improvement which comprises introducing tungsten hexachloride and a vaporous source of carbon selected from $C_1$–$C_{12}$ hydrocarbons, $C_1$–$C_8$ halogenated hydrocarbons or mixtures of such compounds into the reaction zone, the source of carbon being used in amounts sufficient to provide in the tungsten carbide product withdrawn from the reaction zone at least one atom of carbon for each atom of tungsten, withdrawing from the reaction zone solid tungsten carbide product having ditungsten carbide as its principal component, calcining the solid tungsten carbide product in a calciner at from about 800° C. to about 1200° C. for from about one to about four hours and removing from the calciner solid tungsten carbide having monotungsten carbide as its principal component and containing less than 5 weight percent ditungsten carbide.

15. The process of Claim 14 wherein the source of carbon is 1,1,2-trichloroethane.

References Cited

UNITED STATES PATENTS

| | | | |
|---|---|---|---|
| 3,482,941 | 12/1969 | Palm | 423—440 X |
| 3,253,886 | 5/1966 | Lamprey et al. | 423—440 X |

OTHER REFERENCES

Schwarzkopf et al.: "Refractory Hard Metals," 1953, pp. 101–107.

Friedrich et al.: "Zeitschrift für Anorganische und Allgemeine Chemie," vol. 144, pp. 184–185 (1925).

MILTON WEISSMAN, Primary Examiner

U.S. Cl. X.R.

75—204